United States Patent [19]

Imazeki et al.

[11] 4,424,570

[45] Jan. 3, 1984

[54] TRACER CONTROL SYSTEM

[75] Inventors: Ryoji Imazeki; Etsuo Yamazaki, both of Hachioji, Japan

[73] Assignee: Fujitsu Fanuc Limited, Tokyo, Japan

[21] Appl. No.: 272,200

[22] Filed: Jun. 10, 1981

[30] Foreign Application Priority Data

Jun. 18, 1980 [JP] Japan .................. 55-82567

[51] Int. Cl.³ .................. G05B 19/33; G06F 15/46
[52] U.S. Cl. .................. 364/520; 318/571; 318/578; 364/174; 364/474
[58] Field of Search .................. 364/474, 475, 167–171, 364/520, 174; 318/578, 571

[56] References Cited

U.S. PATENT DOCUMENTS

| | | | |
|---|---|---|---|
| 3,624,343 | 11/1971 | Stjernstrom et al. | 318/578 X |
| 3,707,662 | 12/1972 | Hoffman | 318/578 |
| 3,764,877 | 10/1973 | Meyer | 318/578 |
| 4,064,446 | 12/1977 | Krohn | 318/578 |
| 4,084,244 | 4/1978 | Floter | 318/578 X |
| 4,117,385 | 9/1978 | Limbach | 318/578 |
| 4,325,013 | 4/1982 | Wenzel | 318/578 |

*Primary Examiner*—Joseph F. Ruggiero
*Attorney, Agent, or Firm*—Staas & Halsey

[57] ABSTRACT

In a tracer control system which controls tracing based on displacement signals from a tracer head tracing the surface of a model, there are provided position detectors for detecting the positions of a tracing machine along the X, Y and Z axes and angle correcting means. The difference between a set trace direction and the actual trace direction detected by the position detectors is obtained for every other fixed distance of movement along the X-axis or Y-axis direction and a trace velocity along the X-axis or Y-axis direction is corrected by the angle correcting means so that the above difference may be reduced to zero, thereby controlling tracing to be performed in the set trace direction.

4 Claims, 4 Drawing Figures

TRACER CONTROL SYSTEM

BACKGROUND OF THE INVENTION

1. Field of the Invention

The present invention relates to a tracer control system which ensures accurate control tracing in an arbitrary direction.

2. Description of the Prior Art

In the case of tracing in such an arbitrary direction as shown in FIG. 1 in which the trace direction in the X-Y plane has an angle $\alpha$ to the X axis, trace velocities $V_{A\alpha}$ and $V_Z$ along the $A\alpha$ axis and the Z axis respectively are obtained by calculation from displacement signals which are derived from a tracer head, and $V_X = V_{A\alpha} \cdot \cos \alpha$ and $V_Y = V_{A\alpha} \cdot \sin \alpha$ are calculated from the trace velocity $V_{A\alpha}$ for driving motors in the X, Y and Z axes.

In such conventional tracing in an arbitrary direction, for example, if the Y-axis trace velocity $V_Y$ is affected by an offset voltage, the $A\alpha$ axis varies to assume an angle $$\tan^{-1}\left(\frac{V_Y + \Delta V_Y}{V_X}\right),$$

with the result that the tracing is carried out in a direction different from that having the set angle $\alpha$ to the X axis.

SUMMARY OF THE INVENTION

It is an object of the present invention to provide a tracer control system which controls a tracing machine to accurately perform its tracing in a set direction.

Briefly stated, the tracer control system of the present invention is provided with position detectors for detecting the positions of a tracing machine in the X, Y and Z axes and angle correcting means; the difference between a set trace direction and the actual trace direction detected by the position detectors is obtained for each constant distance of movement in the X-axis or Y-axis direction; and the trace velocity in the Y-axis or X-axis direction is corrected by the angle correcting means so that the abovesaid difference may be reduced to zero, thus ensuring that the tracing occurs in the set direction.

DESCRIPTION OF THE PREFERRED EMBODIMENTS

Figure 1:
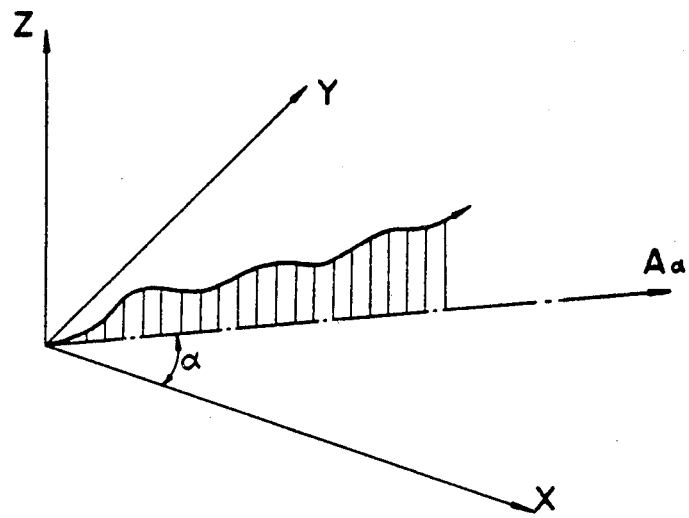
FIG. 1 is explanatory of tracing in an arbitrary direction.
Figure 2:
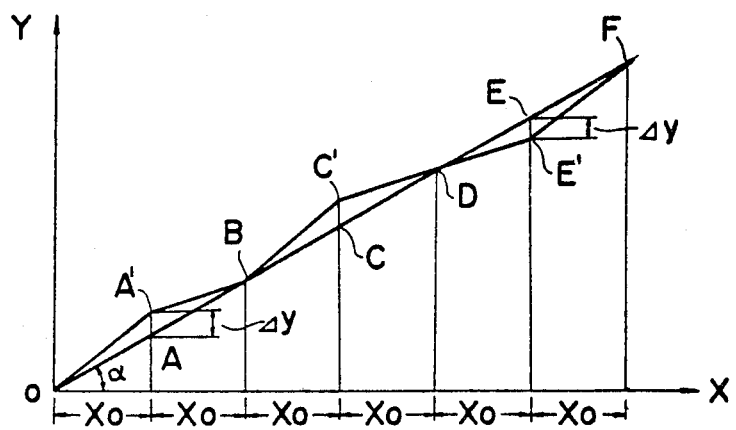
FIG. 2 is explanatory of the principles of the present invention.

FIG. 2 is a diagram explanatory of the principles of the present invention. If a direction having an angle $\alpha$ relative to the X axis is a set trace direction, then tracing is carried out with no angle correction at first. Assuming that a point A' has been reached after the movement of unit distance $x_0$ in the X-axis direction, and that a point A should have been reached in the set trace direction, means that there is a deviation $\Delta y$ in the Y-axis direction. Letting the trace velocities along the X and Y axes be represented by $V_X$ and $V_Y$ and the time for reaching the point A' by t, the next point B in the set trace direction can be reached by selecting the trace velocity $V_{y'}$ in the Y axis as follows:

$$V'_Y = V_Y - 2 \cdot \frac{\Delta Y}{t} \qquad (1)$$

Thereafter the Y-axis trace velocity is similarly corrected for each movement of two unit distances $x_0$ along the X axis. In the event that a point E' has been reached instead of a point E that was desired to be reached, the Y-axis trace velocity $V_{y'}$ for reaching a point F is selected as follows:

$$V'_Y = V_Y + 2 \cdot \frac{\Delta Y}{t} \qquad (2)$$

By selecting the unit distance $x_0$ to be small, the actual trace direction can be made substantially identical with the set trace direction since the actual trace direction is corrected for each unit distance $x_0$.

Figure 3:
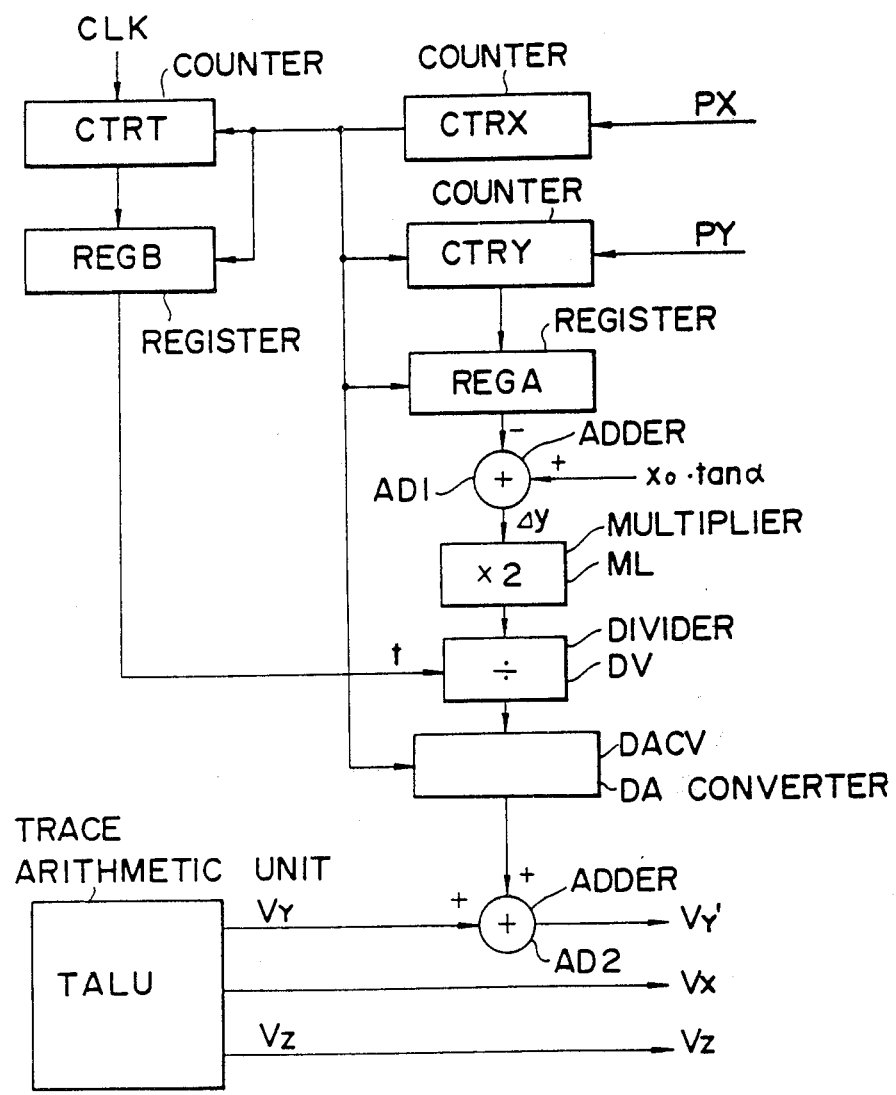
FIG. 3 is a block diagram illustrating the principal part of an embodiment of the present invention.

FIG. 3 illustrates in block form the principal part of an embodiment of the present invention. Position detection pulses PX corresponding to motion along the X axis are counted by a counter CTRX and position detection pulses PY in the Y axis are counted by a counter CTRY. The counter CTRX has such a count capacity that if overflows when counting the position detection pulses PX corresponding in number to the aforementioned unit distance $x_0$ and this overflow signal is used as a reset signal for each of the counters CTRY and CTRT, as a set signal for each of registers REGA and REGB and as a sampling signal for a D-A converter DACV. The counter CTRT counts clock pulses CLK and its count content is set by the overflow signal in the register REGB and then reset. Similarly, the count content of the counter CTRY is also set by the overflow signal in the register REGA, the counter CTRY thereafter being reset.

The content of the register REGB indicates the time t for the movement of the unit distance $x_0$ in the X-axis direction and the content of the register REGA indicates the distance moved along the Y-axis direction during the movement through the unit distance $x_0$ along the X-axis direction. Since the angle $\alpha$ of the trace direction with respect to the X axis is predetermined, the distance of movement in the Y-axis direction after the movement of the unit distance $x_0$ in the X-axis direction is desired to be $x_0 \cdot \tan \alpha$. Then, by obtaining the difference between the content of the register REGA and $x_0 \cdot \tan \alpha$ in an adder AD1, the deviation $\Delta y$ from the predetermined position can be detected.

The deviation $\Delta y$ is doubled by a multiplier ML, the output from which is applied to a divider DV, wherein a division $(2 \cdot \Delta y)/t$ is effected using the content of the register REGB as the denominator. In the case of a binary digital signal, it is doubled by a one-bit shift, so that the multiplier ML can be formed by a simple shift circuit.

The output from the divider DV is provided by the D-A converter DACV for conversion into an analog signal, which is applied to an adder AD2, wherein it is added to the Y-axis trace velocity signal $V_y$ from a trace arithmetic unit TALU. In other words, the trace velocity signal $V_{y'}$ is subjected to the angle correction in accordance with expression (1) or (2) is yielded.

The trace velocity signal $V_y'$ thus obtained and the velocity signals $V_X$ and $V_Z$ in the X and Y axes are applied to motor drive circuits of the respective axes, performing a trace in the direction having the angle $\alpha$ relative to the X axis.

When the abovesaid angle $\alpha$ approaches 90°, the time necessary for movement at the unit distance $x_0$ in the X-axis direction increases and this calls for an increased count capacity of the counter CTRY. Therefore, it is preferred to perform the correction while switching the relation between the X and Y axes for each 45°, such as 0° to 45°, 45° to 90°, 90° to 135° and 135° to 180°.

Figure 4:
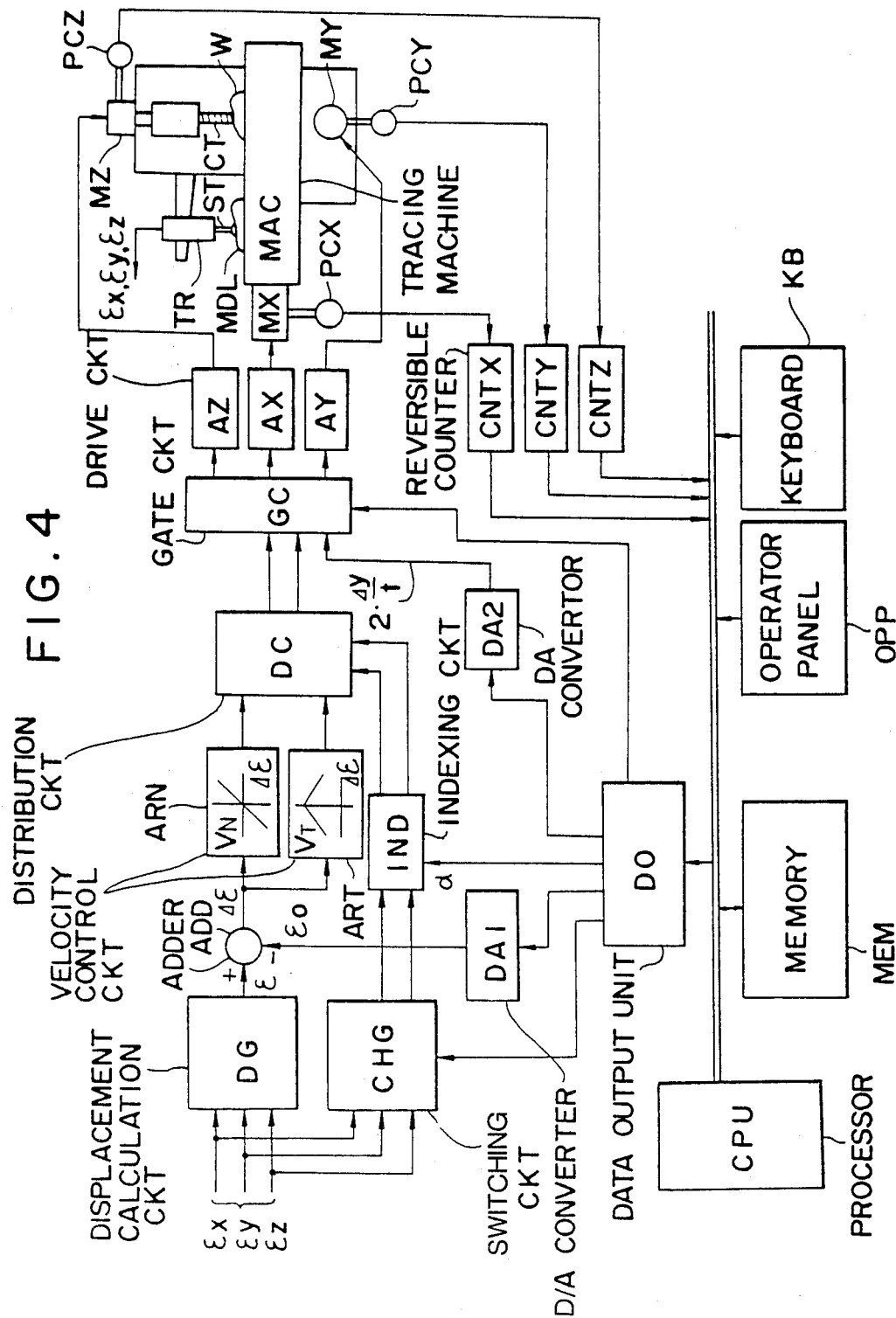
FIG. 4 is a block diagram illustrating another embodiment of the present invention.

FIG. 4 illustrates in block form a tracer control equipment provided with a processor. A tracing machine MAC is equipped with a motor MZ for moving in the Z-axis direction a tracer head TR having a stylus ST for contact with a model MDL and a cutter CT for cutting a work W, motors MX and MY for moving the model MDL and the work W in the X-Y plane, and position detectors PCX, PCY and PCZ for position detection, such as resolvers, pulse coders or the like.

A displacement calculation circuit DG conducts a calculation using displacement signals $\epsilon_x$, $\epsilon_y$ and $\epsilon_z$ from the tracer head TR to provide a composite displacement signal $\epsilon = \sqrt{\epsilon_x^2 + \epsilon_y^2 + \epsilon_z^2}$. A switching circuit CHG responds to a command signal to apply two of the displacement signals $\epsilon_x$, $\epsilon_y$ and $\epsilon_z$ to an indexing circuit IND. Pulses from the position detectors PCX, PCY and PCZ are respectively applied to reversible counters CNTX, CNTY and CNTZ, wherein they are counted up or down depending on the direction of movement of the tracing machine, and the count contents of the counters each indicate the current position of the stylus ST along each axis.

A memory MEM has prestored therein a control program and various data. For example, from a keyboard KB are entered data such as a trace direction, a trace velocity, a nominal deflection, an approach velocity, a pick feed velocity and they are stored under control of a processor CPU. An operator panel OPP has velocity setting dials, a start button and so forth. Data from the processor CPU to the respective parts are provided via a data output unit DO.

The nominal deflection stored in the memory MEM is read out therefrom under control of the processor CPU and applied via the data output unit DO to a D-A converter DA1, from which an analog nominal deflection signal $\epsilon_0$ is provided to an adder ADD to obtain the difference between the nominal deflection signal and the composite displacement signal $\epsilon$. The resulting difference signal $\Delta\epsilon$ is applied to velocity control circuits ARN and ART to provide therefrom a normal-direction velocity signal $V_N$ and a tangential-direction velocity signal $V_T$ to a distribution circuit DC.

The indexing circuit IND applies to the distribution circuit DC displacement direction signals $\sin\beta$ and $\cos\beta$ coordinate-transformed in accordance with a trace direction signal. The distribution circuit DC yields a velocity signal $V\alpha$ along the trace axis $A\alpha$ and a velocity signal $V_Z$ along the Z axis. The velocity signal $V\alpha$ is converted by a gate circuit GC into X-axis and Y-axis velocity signals in accordance with the trace direction signal. The velocity signals along the respective axes are provided to drive circuits AX, AY and AZ to drive the motors MX, MY and MZ for the respective axes, thus performing tracing in the direction of the axis $A\alpha$.

The movement at the unit distance $x_0$ in the X-axis direction is judged by the processor CPU by reading out the content of the counter CNTX. The previous content of the counter CNTX is stored in the memory MEM and it is judged whether the difference between the stored content and the current content of the counter CNTX is the unit distance $x_0$ or not. The time $t$ for the movement through the unit distance $x_0$ can easily be discerned by counting clock pulses in the processor CPU. When the movement at the unit distance $x_0$ is detected, the content of the counter CNTY is read out therefrom and compared with the previous content of the counter CNTY stored in the memory, by which it is possible to obtain the distance actually moved in the Y-axis direction by the movement at the unit distance $x_0$.

The angle $\alpha$ to the X axis and the unit distance $x_0$ are predetermined and $x_0 \cdot \tan\alpha$ is calculated and prestored in the memory MEM, so that the deviation $\Delta y$ can be obtained, by which the second term of expression (1) or (2) is calculated. The resulting angle correction signal is applied from the processor CPU to a D-A converter DA 2 via the data output unit DO and provided as an analog angle correction signal to the gate circuit GC to correct the Y-axis velocity signal. This ensures accurate tracing in the set trace direction.

As has been described in the foregoing, according to the present invention, the difference between the set trace direction and the actual trace direction detected by the position detectors is obtained for each constant distance of movement in the X or Y axis and the trace velocity in the X or Y axis is corrected so that the abovesaid difference may be reduced to zero. The angle correcting means can be achieved by such an arrangement as shown in FIG. 3 or 4 which conducts the calculation of expression (1) or (2). Since tracing is always performed in the set trace direction, the tracing accuracy can be enhanced. Furthermore, since tracing can be effected in an arbitrary direction in the X-Y plane, it is possible to select an optimum trace direction in accordance with the configuration of the model MDL.

It will be apparent that many modifications and variations may be effected without departing from the scope of the novel concepts of this invention.

What is claimed is:

1. A tracer control system comprising
    mean for calculating the magnitude of the displacement of a stylus tracing the surface of a model with respect to a tracer head from displacement signals from the tracer head, and for calculating trace velocities along (1) a set trace axis in a plane defined by two axes of the tracer control system and (2) a third axes of the tracer control system, so that the magnitude of the displacement may become constant,
    a respective position detector for detecting the position of said tracer head along each of said two axes, one of said two axes being a selected axis and the other being a non-selected axis, and said set trace direction being at a selected angle to said non-selected axis, and
    angle correcting means for determining the difference between the set trace direction and the actual trace direction in said plane in terms of the difference between the actual and a desired output of the position detector corresponding to said selected axis for a predetermined constant distance along the non-selected axis, and for correcting for each said difference by controlling the component of trace velocity along said selected axis for the subsequent motion through said predetermined constant distance along the non-selected axis during said tracing along said set trace direction, whereby said tracing is performed along said set trace direction.

2. The system of claim 1, comprising said position detectors outputting a pulse for each unit interval of distance that is moved by said tracer head along each respective axis, said prdetermined constant distance being larger than said unit interval of distance, and said angle correcting means including:

a first counter for counting the pulses corresponding to the unit intervals of distance moved along said non-selected axis, up to a predetermined value, and for ouputting an overflow signal when said first counter reaches said predetermined value;

a second counter for counting the pulses corresponding to the unit intervals of distance moved along said selected axis, until said overflow signal is outputted from said first counter, said overflow signal resetting said second counter;

a first register for receiving the count of said second counter upon the occurrence of said overflow signal;

a third counter for counting clock pulses from a clock until the occurrence of said overflow signal;

a second register for receiving the count of clock pulses from said third counter upon the occurrence of said overflow signal;

digital means for forming the difference between a predetermined value corresponding to a desired amount of movement along said selected axis and the content of said first register, for doubling said difference and for dividing the doubled difference by the output of said second register upon each occurrence of said overflow signal;

a digital-to-analog converter for converting the divided doubled difference; and an analog adder for adding the value of the trace velocity component along said selected axis.

3. The system of claim 2, comprising means for interchanging said selected and non-selected axes so that the angle between a line along said set trace direction and a line along the currently non-selected axis remains equal to or less than 45°.

4. The system of claim 1, 2 or 3, wherein said difference between said set and actual trace directions is determined, and said tracing velocity component along said selected axis is corrected, during each interval of motion along said set trace direction corresponding to twice said predetermined constant distance along said non-selected axis.

* * * * *

UNITED STATES PATENT AND TRADEMARK OFFICE
CERTIFICATE OF CORRECTION

PATENT NO. : 4,424,570
DATED : 3 January 1984
INVENTOR(S) : Imazeki et al

It is certified that error appears in the above-identified patent and that said Letters Patent is hereby corrected as shown below:

Col. 2, line 29, "if" should be --it--;

line 62, "by" should be --to--.

Col. 4, line 45, "mean" should be --means--;

line 49, "axis" should be --direction--;

line 51, "axes" should be --axis--.

Col. 5, line 3, "set" should be --actual--;

line 9, "prde-" should be --prede- --.

Col. 6, line 16, after "the" (first occurrence) insert --output of said converter to the--.

Signed and Sealed this

Seventeenth Day of July 1984

[SEAL]

Attest:

GERALD J. MOSSINGHOFF

Attesting Officer    Commissioner of Patents and Trademarks